(12) United States Patent
Jaquess (10) Patent No.: US 12,505,616 B2
(45) Date of Patent: Dec. 23, 2025

(54) SYSTEMS AND METHODS FOR LAND SURVEYING

(71) Applicant: Brian Jaquess, San Diego, CA (US)

(72) Inventor: Brian Jaquess, San Diego, CA (US)

(*) Notice: Subject to any disclaimer, the term of this patent is extended or adjusted under 35 U.S.C. 154(b) by 196 days.

(21) Appl. No.: 18/353,292

(22) Filed: Jul. 17, 2023

(65) Prior Publication Data

US 2024/0037849 A1 Feb. 1, 2024

Related U.S. Application Data

(60) Provisional application No. 63/390,849, filed on Jul. 20, 2022.

(51) Int. Cl.
*G06T 17/05* (2011.01)
*G06T 7/10* (2017.01)

(52) U.S. Cl.
CPC .............. *G06T 17/05* (2013.01); *G06T 7/10* (2017.01); *G06T 2207/10028* (2013.01); *G06T 2207/20081* (2013.01); *G06T 2207/20112* (2013.01); *G06T 2207/30181* (2013.01)

(58) Field of Classification Search
CPC ......... G06T 17/05; G06T 19/003; G06T 7/10; G06T 2207/10028; G06T 2207/30181; G06T 2210/61; G06T 2207/20112; G06T 2207/20081; G06T 2219/024

USPC ........................................................ 345/418
See application file for complete search history.

(56) References Cited

U.S. PATENT DOCUMENTS

| 10,607,406 | B2* | 3/2020 | Sen ..................... G01B 17/06 |
| 12,254,568 | B2* | 3/2025 | Baker ................. G01C 21/383 |
| 2009/0271362 | A1* | 10/2009 | Moestl ............... G06F 16/2453 |
| | | | 707/999.005 |
| 2017/0106885 | A1* | 4/2017 | Singh ..................... B61L 23/045 |
| 2018/0321031 | A1* | 11/2018 | Baskin ..................... G01C 3/08 |
| 2019/0228573 | A1* | 7/2019 | Sen ...................... G01B 15/04 |
| 2021/0213616 | A1* | 7/2021 | Ross ..................... G06V 20/10 |
| 2021/0274358 | A1* | 9/2021 | Shankar .............. H04W 64/003 |
| 2022/0066060 | A1* | 3/2022 | Gillott .................. G01V 1/375 |

FOREIGN PATENT DOCUMENTS

| JP | 2017058947 | * | 3/2017 | ............. G06F 16/00 |
| WO | WO-2020007483 A1 | * | 1/2020 | ............. G01S 13/89 |

* cited by examiner

*Primary Examiner* — Phu K Nguyen
(74) *Attorney, Agent, or Firm* — Andre Adkins (57) ABSTRACT

A method, computer system, and a computer program for optimizing land surveying is provided. An associated method includes receiving a plurality of sensor data; receiving a plurality of commands associated with at least a site pertaining to the surveying data; analyzing the surveying data based on the plurality of commands; and rendering a 3D-mapping of the site based on the analysis.

20 Claims, 6 Drawing Sheets

SYSTEMS AND METHODS FOR LAND SURVEYING

CROSS REFERENCE TO RELATED CO-PENDING APPLICATIONS

This application claims the benefit of U.S. provisional application Ser. No. 63/390,849 filed on Jul. 20, 2022 and entitled SYSTEMS AND METHODS FOR LAND SURVEYING, which is commonly assigned and the contents of which are expressly incorporated herein by reference.

FIELD

This disclosure relates generally to systems and methods for land surveying, and more particularly to computing systems, computer-implemented methods, and computer program products configured to optimize land surveying via data management.

BACKGROUND

Land surveying is the process of measuring a plot of land or sea to identify boundaries for design and construction purposes, settle property line disputes, create topographic maps, etc. In addition to identifying and tracking surface and structure-based features, surveying may also integrate data acquired from aerial and/or sub-terrain based sources (e.g., unmanned aerial vehicles, aquatic mapping devices, etc.) in order to support rendering of full three dimensional layouts of surveyed plots that account for swells, encumbrances, air restrictions, and the like. Typically, computer animated design software and other applicable land surveying map rendering software (e.g., Autodesk) are configured to receive data from applicable data sources associated with the land surveying of a plot for processing and rendering visualizations of the plot. However due to the voluminous amount of data being continuously processed in real-time along with other algorithms applied to the data (e.g., 3D point cloud generation, 3D change detection, machine learning/artificial intelligence based techniques, etc.), issues such as latency, erroneous synchronization, and the like arise. Thus, what is needed are techniques to segment and prioritize data being processed in order to not only optimize rendering of visualizations associated with the land surveying process, but also allow visualizations to be shared in a collaborative manner across users operating on the cloud.

SUMMARY

Additional aspects and/or advantages will be set forth in part in the description which follows and, in part, will be apparent from the description, or may be learned by practice of the invention.

With the foregoing and other objects in view, there is provided, in accordance with the invention, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

According to one exemplary embodiment, a computer-implemented method for land surveying is provided. In some embodiments, the computer-implemented method for land surveying comprises receiving a plurality of sensor data; receiving a plurality of commands associated with at least a site pertaining to the surveying data; analyzing the surveying data based on the plurality of commands; and rendering a three dimensional (3D) mapping of the site based on the analysis.

In some embodiments, the computer-implemented method for land surveying further comprises notifying at least one personnel at the site of a detected surveying data gap at the site based on the rendering; and requesting supplemental sensor data. The supplemental sensor data being configured to rectify the detected surveying data gap allowing one or more interactive 3D visualizations of the site to be rendered based on the mapping.

In some embodiments, analyzing the surveying data comprises segmenting the plurality of sensor data based on the plurality of commands; and filtering the resulting segments based on a detected lower ranking. The detected lower ranking allocated based on one or more of quality of the sensor data, the geolocation associated with the sensor data, the topography of the site associated with the sensor data, and a plurality of conditions of the site associated with the sensor data. The surveying data iteratively integrating the unfiltered segments of sensor data.

In some embodiments, analyzing the surveying data comprises utilizing one or more machine learning models in which the one or more machine learning models are configured to support at least one of a reinforcement learning algorithm, a supervised learning algorithm, and an unsupervised learning algorithm.

In some embodiments, rendering the 3D-mapping comprises generating a 3D point cloud derived from the plurality of sensor data; wherein the plurality of sensor data is ascertained from one or more of a computing device, unmanned aerial vehicle (UAV), a land rovering vehicle, and an aquatic-based device.

In some embodiments, a latency associated with rendering the 3D-mapping and the latency of rendering the 3D-mapping of the site is reduced by the unfiltered segments being cleaned and stored in a cloud-based repository in real-time.

According to one exemplary embodiment, a system for land surveying is provided. In some embodiments, the system comprises at least one server configured to operate a centralized platform for land surveying on a cloud-based network. The centralized platform designed to support collaborative interactions on one or more interactive 3D visualizations of a site associated with surveying data among a plurality of users.

In some embodiments, the centralized platform is a virtual reality ("VR"), augmented reality ("AR"), mixed reality, and/or extended reality-based platform designed to allow the plurality of users to collaboratively interact with one or more interactive 3D visualizations in at least one virtual environment operated by a VR/AR service provider. The centralized platform further supports presentation of visualizations of a site being surveyed to a remote user based upon surveying data collected by a user who is physically on site in a manner where elements of the visualizations are rendered based on user defined priorities of filtered segments of surveying data.

Although the invention is illustrated and described herein as embodied in a system and method for managing worksites, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

The following described exemplary embodiments provide a method, computer system, and computer program product for optimizing land surveying. Land surveying involves the collection of data from various sources associated with a geographic region or site in order to not only ascertain metes and bounds of the region, but also perform imaging of objects and/or terrains associated with the region. Traditionally, data collected at the site is transmitted to a server associated with a CAD software or other applicable software configured to process the data in order to render imaging of the site. However due to the voluminous amount of data being collected and processed in real-time, the rendering of visualizations of the site comprise various issues including, but not limited to bandwidth/capacity, latency issues, missing components (e.g., objects, landmarks, underground structures, etc. associated with the site). For example, the applicable CAD software may not account for real-time updates associated with the site resulting in the imaging of the site being inaccurate due to incorrect depiction and other applicable issues. In addition, interactive collaboration among users simultaneously interacting with the visualizations of the site requires a significant amount of bandwidth in order to prevent latency issues caused by supplemental data associated with the site being collected in addition to modifications made to the visualizations via inputs from the users. Therefore, the present embodiments have the capacity to improve land surveying by not only rendering unconventional visualizations of regions that support real-time collaborative interactions among users, but also improve the rendering of visualizations of sites by providing a mechanism to prioritize and segment collected data resulting in reduction of latency in generating, updating, and maintaining the visualizations of sites being surveyed.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
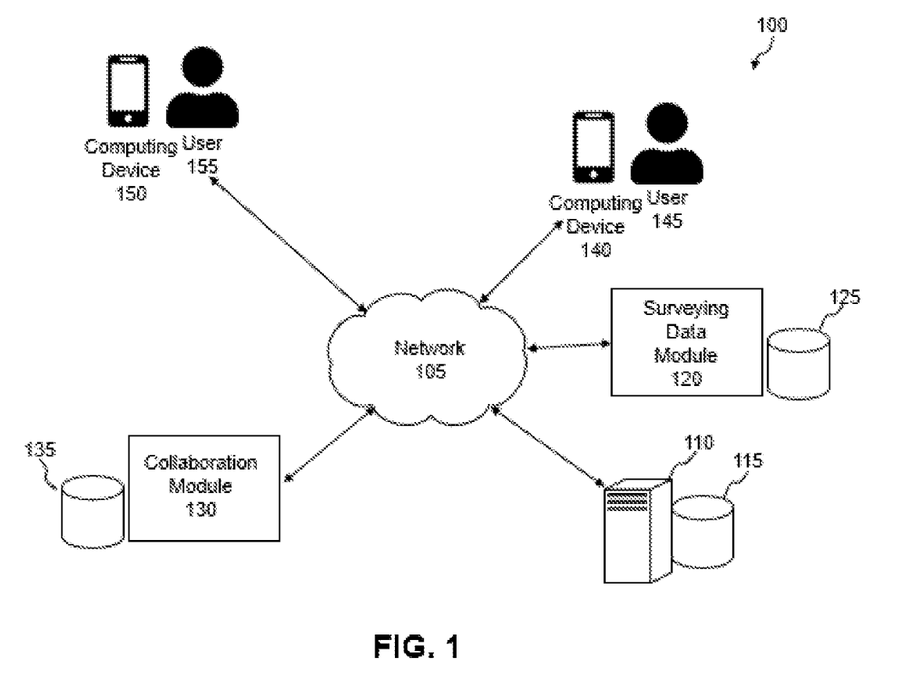
FIG. 1 is a block diagram depicting an exemplary land surveying system, according to an example embodiment.

Referring now to FIG. 1, a system for land surveying 100 is depicted, according to an exemplary embodiment. In some embodiments, system 100 comprises a server 110, a database 115 communicatively coupled to server 110, a surveying data module 120, a surveying module database 125 communicatively coupled to surveying data module 120, a collaborative module 130, a collaborative module database 135 communicatively coupled to collaborative module 130, a computing device 140 associated with a user 145, a computing device 150 associated with a user 155, in which each of the aforementioned are configured to be communicatively coupled over network 105. System 100 is a computer-based system and the various components of system 100 are implemented at least partially by hardware at one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. System 100 illustrates one of many possible arrangements of components configured to perform the functionality described herein; however, other arrangements may include fewer or different components, and the division of work between the components may vary depending on the arrangement. As described herein, computing devices 140, 150, and any other applicable computing device of system 100 includes but is not limited to a mobile phone, tablet, smart phone, desktop, laptop, wearable technology, computer-mediated reality devices (e.g., AR/VR headsets, AR/VR goggles, AR/VR glasses, etc.), robotics, mainframe computer, quantum computer or any other applicable device or system including at least a processor. In some embodiments, the servers mentioned this disclosure may be a stand-alone and/or enterprise-class servers operating a server OS such as a MICROSOFT® OS, a UNIX® OS, a LINUX® OS, or other suitable server-based OS. One or more servers may be operated and/or maintained by the same or different entities. Server 110 may be implemented in hardware, software, or a combination of hardware and software. Network 105 may be implemented as a Local Area Network (LAN), Wide Area Network (WAN), mobile communication network (GSM, GPRS, CDMA, MOBITEX, EDGE), Ethernet or the Internet, one or more terrestrial, satellite or wireless links, or any medium or mechanism that provides for the exchange of data between the aforementioned components of system 100.

In some embodiments, server 110 is configured to generate a centralized platform configured to be presented on computing devices 140 and 150 over network 105. The centralized platform is designed to function as downloadable software that supports entry of user inputs associated with users 145 and 155 via keyboard, virtual keyboards, voice inputs, virtual environment-based interactions (e.g., swiping gestures, nodding gestures, eye movements, etc.), or any other applicable manner of providing inputs known to those of ordinary skill in the art. In some embodiments, server 110 is configured to host a VR/AR-based virtual environment designed for collaborative interactions (e.g., conferencing, simultaneous virtual object manipulation, site visualization manipulation, etc.) among users 145 and 155 allowing generated visualizations to be presented in real-time. Additionally, server 110 may comprise one or more crawlers configured to gather data associated with one or more of a particular site, geographic region, users 145 and 155, etc. from internet-based sources allowing optimization of updates to the visualizations along with prioritization of data collected by components of system 100. Examples of types of data that may be collecting by the crawlers may include, but are not limited to infrastructure data (e.g., design blueprints, building codes, historical information, etc.), social media-based data, weather data, urban planning data, or any other applicable data utilized for rendering mapping of buildings, streets, geographic regions, etc. known to those of ordinary skill of the art. For example, an online article may announce the addition of a new building to a geographic region in which the crawlers may extract applicable information from the article and store the applicable information in database 115 for use by the applicable module during the rendering of the visualizations associated with the geographic region.

Surveying data module 120 is tasked with the collection and storage of surveying data and sensor data associated with a site. It should be noted that sensor data in some instances may be a type of surveying data and surveying data is utilized to support mapping of the site in accordance with the underlying uses and purpose of a survey map for the site of interest. Surveying data module 120 is continuously collecting and processing surveying data in order to not only apply artificial intelligence/machine learning-based techniques to the surveying data, but also to segment surveying data for the purpose of optimizing the rendering of visualizations of one or more sites of interest for users 145 and 155 collaboratively working on said sites across a cloud-based network, such as network 105. For example, users 145 and 155 may be surveyors attempting to visualize the metes and bounds of a particular site in which user 145 is physically present on the particular site and user 155 is remote. Surveying data module 120 provides the applicable mechanisms to enable collaboration module 130 to visualize the particular site by rendering a 3D-mapping of the particular site, in which the 3D-mapping is produced in a manner where the latency ordinarily present during the rendering process is reduced due to the surveying data being segmented and subsequently filtered. In some embodiments, the filtering is performed based upon conditions allowing the visualizations of the particular site to be cleaned and stored in a cloud-based repository, such as surveying module database 125 and collaborative module database 135, allowing users 145 and 155 to simultaneously interact with the 3D-mapping in real-time in a collaborative manner.

Collaboration module 130 is designed to support the processing of commands/instructions relating to the visualizations, designation of priorities associated with the surveying data which guides the segmentation and filtration of the surveying data, and the visualization of sites based upon the aforementioned (e.g., commands, priorities, segmentation, etc.) in which the visualization supports collaborative interactions among users 145 and 155 within a virtual environment; thus, optimizing the visualization of sites being surveyed. In some embodiments, collaboration module 130 is configured to perform visualization of sites based on one or more of 3-D positional information, absolute coordinate systems, global positioning/mapping systems, and any other applicable mapping-based system information known to those of ordinary skill in the art. Collaboration module 130 further supports synchronization of computing devices 140 and 150 allowing commands, gestures/movements, and any other applicable interactions of user 155 to be applied and/or superimposed to the visualizations being rendered and presented to computing device 140, and vice-versa. For example, if user 155 viewing the visualizations remotely desires to focus on a particular element being viewed by user 145 in real-time then user 155 may initiate one or more manipulation actions (e.g., pause, zoom, rearrange, re-orient, etc.) resulting in modifications being applied to the visualizations being presented to user 145 and user 155 in real-time. In addition, synchronization of computing devices 140 and 150 allows movements, gestures, etc. of user 145 applied to the visualizations being rendered in real-time based upon surveying data being collected on-site to account for acceleration, tilting, and other AR/VR-based movements allowing user 155 to control one or more functions of user 145 within the virtual environment depicting the visualizations. It should be noted that the purpose of the aforementioned features are designed to allow remote users to view higher detailed visualizations of the site at a granular level while applying the segmentation and filtration of the surveying data in order to circumvent latency and other demands on the cloud-based server. Segmented surveying data is filtered based upon on prioritization of the surveying data and subsequently stored in collaborative module database 135.

In some embodiments, collaboration module 130 supports visualizations of sites that allow real-time walkthrough features in which collaboration module 130 communicates with computing devices 140 and 150 in order to obtain positional information along with relative direction information allowing user 155 who is remote to view on computing device 150 the perspective of the site from the standpoint of user 145 collecting surveying data physically at the site via computing device 140. In light of the significant amount of computing resources and bandwidth necessary to render real-time visualizations of the site to computing device 150, collaboration module 130 communicates with surveying data module 120 in order to obtain filtered segments of the surveying data selected based on priorities designated by users 145 and 155 resulting in the visualizations comprising only the filtered segment data. For example, users 145 and 155 may wish to discuss an object of interest associated with the applicable site user 145 is traversing in which the visualizations presented to user 155 will not have the filtered out segments of surveying data presented to them in the visualizations. This approach allows reduction of latency during the rendering process by preventing collaboration module 130 from having to visualize the totality of the surveying data and only rendering the segments of surveying data that are not filtered out during the filtration process.

Figure 2:
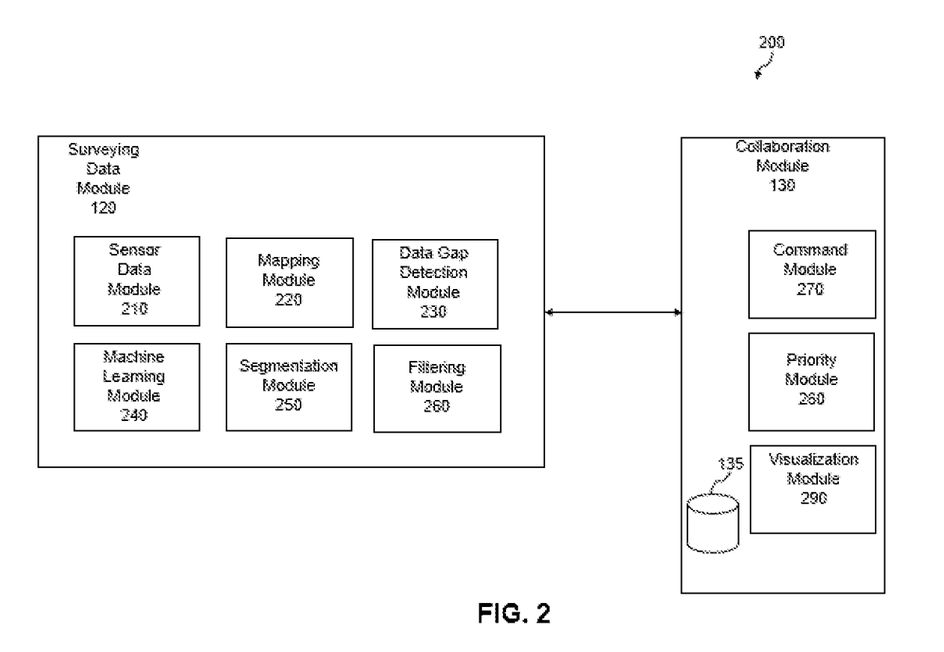
FIG. 2 illustrates a block diagram of a surveying data module and a collaboration module of the system of FIG. 1, according to an exemplary embodiment.

Referring now to FIG. 2, an example architecture 200 of surveying data module 120 and collaborative module 130 is depicted, according to an exemplary embodiment. In some embodiments, surveying data module 120 comprises a sensor data module 210, a mapping module 220, a data gap detection module 230, a machine learning module 240, a segmentation module 250, and a filtering module 260. Collaboration module 130 comprises a command module 270, a priority module 280, and a visualization module 290. It should be noted that each of the aforementioned modules may be configured to interact with each other in order to facilitate the functionalities of system 100. For example, machine learning module 240 may utilize outputs of other modules of the system as training datasets in order to support functions such as, but not limited to reinforcement learning, a supervised learning, unsupervised learning and the like.

Sensor data module 210 is configured to function as sensor systems (i.e., a collection of sensors communicatively coupled) associated with one or more sites to be surveyed. It should be noted that the sensors may be associated with but not limited to computing devices 140 and 150, unmanned aerial devices ("UAVs"), land rovering devices, aquatic traversing devices, theodolites, electronic measuring devices, total stations, 3D scanners, GPS/GNSS, level and rod, and any other applicable devices/equipment including sensors associated with land surveying and mapping infrastructures known to those of ordinary skill in the art. Sensor data collected by sensor data module 210 is configured to be transmitted to server 110 and/or one or more of the aforementioned modules over network 105. The one or more sensor systems may include, but are not limited to, cameras, microphones, position sensors, gyroscopes, accelerometers, pressure sensors, cameras, microphones, temperature sensors, biological-based sensors (e.g., heart-rate, biometric signals, etc.), a bar code scanner, an RFID scanner, an infrared camera, a forward-looking infrared (FLIR) camera for heat detection, a time-of-flight camera for measuring distance, a radar sensor, a LiDAR sensor, a LADAR (laser detection and ranging) sensor, a temperature sensor, a humidity sensor, a motion sensor, internet-of-things ("IOT") sensors, or any other applicable type of sensors known to those of ordinary skill in the art. It should be noted that the plurality of sensor data collected by applicable sensor systems associated with system 100 are configured to be utilized to not only generate point clouds for one or more sites, but also enable rendering of high resolution topographical survey maps of the sites via high detailed three-dimensional (3-D) visualizations. Due to the voluminous amount of sensor data being collected by sensor data module 210, system 100 aims to reduce the latency and computing resources necessary for the rendering of visualizations either by visualization module 290 and/or the applicable third-party software (i.e., CAD software) utilized to render the 3D mappings of the one or more sites. For example, aerial-based sensor data (e.g., metes/boundaries, dimensions, topography, etc.) may be acquired by the applicable sensors associated with a UAV, land-based sensor data (e.g., terrain, elevation models, etc.) acquired by the applicable sensors associated with a land-rovering device, sub-terrain and/or aquatic related data (e.g., ocean floor mapping, bathymetry, hydrology, underground exploration, etc.) acquired by a sub-terrain exploring vehicle are simultaneously collected and transmitted to sensor data module 210. As a result of the voluminous amount of sensor continuously being collected, the strength and accuracy of the sensor data and surveying data overall becomes impacted. Surveying data module 120 optimizes the land surveying process by finding the most efficient balance between mapping time, network coverage, bandwidth, and communication latency. In particular, sensor data module 210 practices selective processing of sensor data from the various sources by taking into consideration prioritization of surveying data communicated by collaboration module 130.

Mapping module 220 is tasked with mapping the one or more sites based on processing of sensor data collected by sensor data module 210 and surveying data collected over network 105. In some embodiments, mapping module 220 performs mapping by utilizing one or more of Single Photon Lidar (SPL) high-density point cloud generation, LADAR (laser detection and ranging), computer vision techniques (e.g., networks of monitoring systems, etc.), object detection/recognition techniques via neural networks (e.g., UNet, MaskR-CNN, DenseUNet, RoadVecNet, DSAMNet, MDESNet, Changer, NestNet/NestNet2, and the like), aerial imaging, survey point referencing for accurate modeling of XYZ project information, laser scanning, image/video analysis (e.g., historical infrastructure data pertaining to the sites, etc.), artificial intelligence-based landform area and volume calculation (e.g., automated quality control surveyor), and any other applicable mapping techniques known to those of ordinary skill in the art. Mapping module 220 further supports features such as point cloud registration, in which geometrical shapes are fitted to 3-D point clouds resulting in mapping module 220 having the ability to analyze point clouds, compare point clouds of the sites, and combine multiple point clouds to reconstruct a 3-D scene of the sites. Mapping module 220 stores the point clouds in collaborative module database 135, in which point clouds are optimized of surveying data and sensor data segmented and stored in surveying module database 125. The mapping function allows images acquired from the sensor data collection process to be rendered on geographical coordinates in real-time via SLAM algorithms (simultaneous localization and mapping).

Data gap detection module 230 is designed to identify missing portions of the surveying data that need to be supplemented in order for optimized visualizations of the one or more sites to be rendered. It should be noted that one of the purposes of identifying missing portions of surveying data is to support generating the 3D point clouds with the least amount of latency possible, in which data gap detection module 230 is configured to generate notifications to users 145 and 155 upon detection of one or more anomalies associated with the one or more sites being mapped. For example, low visibility, edge meltdowns, incorrect height modeling, color fringes, changes in terrain, infrastructure, landmarks, reference points, and the like associated with the sites are forms of anomalies that may trigger notifications to be generated and transmitted. In some embodiments, the notification anomalies are interactive and overlayed within the virtual environment depicting the visualizations of the one or more sites. For example, user 145 collecting sensor data via computing device 140 during a physical walkthrough of a site may not notice that a sub-terrain element at the site (e.g., pipeline, swell, etc.) has been impacted in which user 155 is alerted of the anomaly in the virtual environment via a notification presented on the visualization at the applicable geographic coordinates of the site. Thus, what user 145 is not able to detect with the plain eye can be detected by the applicable computing device associated with the site and brought to the attention to user 155 in the virtual environment. Identification of missing portions of the surveying data seeks to ensure that the visualizations of sites are as accurate and detailed as possible.

Machine learning module 240 is configured to use one or more heuristics and/or machine learning models for performing one or more of the various aspects as described herein (including, in various embodiments, the natural language processing or image analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, general adversarial networks (GANs), Bayesian network, natural language processing/artificial intelligence-based linguistic analysis techniques, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure. For example, machine learning module 240 is designed to maintain one or more machine learning models dealing with training datasets including data derived from database 115, surveying module database 125, and/or collaborative module database 135. In some embodiments, the outputs of the one or more machine learning models are predictions associated with the mappings, missing portions of the surveying data, prioritization of segmented surveying data, and the like. Based upon analysis of the conversation between users 145 and 155, machine learning module 240 supports ascertaining the context of virtual collaboration between 145 and 155 and generates outputs based upon the ascertained context. For example, users 145 and 155 may be collaboratively working on a surveying project for a site in which user 155 may indicate that the site historically has an issue with infrastructure in which machine learning module 240 generates predictions to the mapping including sub-terrain infrastructure based on historical data within database 115 in addition to the applicable sensor data being collected in real-time at the site.

Segmentation module 250 is tasked with parsing surveying data and/or sensor data in order to reduce latency in addition to reducing the amount of computing resources required to not only render the visualizations of sites, but also maintaining the visualizations on cloud-based servers. In some embodiments, segmentation of surveying data is based upon classification of the applicable data which indicates whether the data is necessary for rendering the optimal visualization of the site. For example, aerial-sourced sensor data may be preferential for certain terrains due to the ability to cover hard to discover areas in which the aerial-sourced sensor data is prioritized for segmentation in order to render a comprehensive visualization that is sustainable to maintain on a cloud-based server that supports real-time collaboration between users 145 and 155 within the virtual environment. In some embodiments, the segmenting of the surveying data is based on the results of a feedback loop operated by machine learning module 240 allowing the surveying data to be parsed and corrected if applicable based on feedback/interactions of users 145 and 155 with the visualizations. For example, a user may indicate in the virtual environment that the quality of data pertaining to a specific area of the site is less than optimal due to low lighting or limited visibility (e.g., a canyon, swell, etc.) in which segmentation module 250 is instructed to segment sensor data associated with the specific area for analysis and ultimately enhance the segmented sensor data for optimization of the visualization of the specific area. Commands may be utilized as rules for orchestration of the segmentation of surveying data that is necessary to render visualizations of the site. For example, segmenting may be accomplished via packetizing surveying data in accordance with commands ascertained from linguistic inputs, in which the packets comprise metadata associated with the requested surveying data that serves as a reference for storage space efficient accessibility on the cloud.

Filtering module 260 is tasked with filtering segmented surveying data based on prioritization of the segmented surveying data. It should be noted that prioritization of the segmented surveying data is subject to a plurality of commands associated with the users 145 and 155 that indicate a ranking and/or grading of the surveying data that is used to generate the visualizations of the one or more sites by filtering out unnecessary surveying data in accordance with the allocated ranking. Prioritization is allocated to segmented surveying data based on including, but not limited to the nature of the surveying project, the historical data associated with the site, the aforementioned ascertained context, the virtual environment the visualizations are depicted within, and the like. In some embodiments, machine learning module 240 may support natural language processing in which analyses of linguistic inputs associated with users 145 and 155 are performed resulting in filtering module 260 to interpret the commands based on the analyses. For example during discussion of the applicable site between users 145 and 155 taking place in a virtual environment, user 145 may indicate that more aerial-based sensor data is necessary in order to optimize viewing of the site from a 3-dimensional perspective, in which analyses of the associated linguistic inputs allows filtering module 260 to prioritize aerial-based sensor data for storing on surveying module database 125 resulting in optimal visualizations of the site to be rendered and depicted within the virtual environment for viewing by users 145 and 155. The storage and management of the data prioritized by filtering module 260 allows for the filtering out of surveying data that would otherwise cause latency issues and unnecessary use of computing resources not only due to transmitting of the surveying data to the applicable CAD software over the cloud (if necessary), but also for real-time visualization rendering and interactions with visualizations in a virtual environment.

Prioritization of surveying data also allows for visualizations of sites to be optimized due to providing the ability to assist data gap detection module 230 with detecting inaccuracies associated with the surveying of a site. For example, low lighting/shadow areas of the site resulting in increased noise and/or homogenous elements (e.g., bodies of water, areas of high vegetation, etc.) need to be rectified in order to optimize the visualization of a site, in which requests for supplemental sensor data are made and the provided supplemental sensor data is prioritized. The supplemental sensor data being allocated priority results in the surveying data associated with a homogenous area that would otherwise be processed by cloud-based servers and stored in surveying module database 125 to be filtered out; thus, reducing latency associated with the visualization rendering process and the amount of computing resources needed for transmitting surveying data to the applicable CAD software for processing if necessary.

Command module 270 is tasked with identifying and managing commands of users 145 and 155. It should be noted that the commands pertain to the one or more sites being surveyed in which users 145 and 155 may provide the commands via user inputs (e.g., manually on the centralized platform via computing devices 140 & 150), VR/AR based interactions (e.g., gestures, linguistic inputs, and the like), virtual keyboards, and any other applicable user input techniques known to those of ordinary skill in the art. The commands may function to not only be one or more determining factors associated with the prioritization of surveying data, but also as a source for contextual information associated with the surveying project. For example, if the commands indicate that surveying of a site is inaccurate then the context may be established that the current mechanisms for acquiring sensor data and surveying data are insufficient because the visualizations do not reflect the site in the most accurate manner. As a result, the commands allow the system to re-configure the techniques to acquire surveying data such as switching to a combination of LIDAR and image based point cloud generation in order to optimize the quality of the surveying data used to produce the visualizations of the site.

In some embodiments, the commands are linguistic inputs of users 145 and 155 received via computing devices 140 & 150 in which machine learning module 240 performs various tasks on linguistic inputs such as but not limited to parsing, tokenization, analyzing utterances of users 145 and 155 in order to not only ascertain commands, but also the context of the surveying project in addition to user feedback for optimization of the rendering of the visualizations. For example, specific areas of the site may have bad lighting conditions resulting in occlusions, low signal to noise, and the like, in which received commands may indicate a preference for LIDAR based sensor data. As a result, segmentation module 250 analyzes the surveying data based on the commands which begins the surveying data prioritization process followed by the filtration of non-prioritized sensor (e.g., non-LIDAR data) from the sensor data being collected by sensor data module 210, in which the unfiltered data (e.g., LIDAR data) is iteratively integrated into the surveying data. This feature allows for version control of rendered visualizations of the surveyed site enabling users 145 and 155 to compare versions of the visualization of a particular site for quality assessment purposes. In some embodiments, machine learning module 240 utilizes one or more of a reinforcement learning algorithm, a supervised learning algorithm, and/or unsupervised learning algorithm in order to perform analysis of the surveying data after the filtration of surveying data in order to ensure that the visualizations of the surveyed site are being optimized.

Priority module 280 functions as the mechanism that ascertains the applicable level of priority that should be applied to the surveying data based on the analysis of the commands. It should be noted that priority module 280 may serve as a mechanism for one or more classification techniques which is applied to the surveying data in order to direct filtering module 260 to apply its filtering techniques accordingly. For example, user commands may indicate that LIDAR sensor data is necessary to optimize the visualizations of a site due to the fact that the collected imaging data may not allow the visualizations to be represented in the most optimal manner. Surveying data that is marked as non-priority is filtered out of the surveying data allowing visualizations to be rendered based on the unfiltered priority data that is stored on cloud-based repositories, such as surveying module database 125. Thus, when visualizations are rendered they comprise surveying data and applicable metadata that do not require unnecessary storage space. Ranking of the surveying data is established by priority module 280 based on the analyses of the commands, in which upon the segmenting of the sensor data the remaining segments are filtered based on a detected lower ranking allocated by priority module 280. For example, surveying data may be segmented in order to facilitate efficient filtering of the sensor data resulting in the sensor data that is not prioritized because of the detected lower ranking applied by priority module 280.

Visualization module 290 is tasked with depicting the visualizations of surveyed sites in virtual environments that support collaborative interactions among users 145 and 155. It should be noted that in various embodiments the visualizations are rendered by the applicable CAD software platform; however, the depiction of the visualizations is manifested within either the centralized platform or the virtual environment. Visualization module 290 supports a plurality of features users 145 and 155 to interact with the visualizations including, but not limited to toggling, zooming, annotating, and any other applicable map-based manipulating features known to those of ordinary skill in the art. Visualization module 290 further supports features that allow notification to the applicable computing devices physically at the site being surveyed in order to request supplemental sensor data necessary to enhance the quality of the visualizations in real-time. For example, personnel at the applicable site being surveyed may be requested by users viewing the visualizations in the virtual environment to provide supplemental sensor data configured to fulfill detected surveying data gaps at the site based on the renderings of the visualizations. This allows low quality sensor data and/or sensor data unnecessary to render the visualizations to be supplemented and/or removed to increase the depiction of the visualizations within the virtual environments. In alternative embodiments, the centralized platform functions as a downloadable software that supports collaborative interactions on the visualizations with a full range of features that include, but are not limited to video conferencing, picture-in-picture display, screen-sharing, map annotations (e.g., shading, coloring, highlighting, etc.), and the like.

Figure 3:
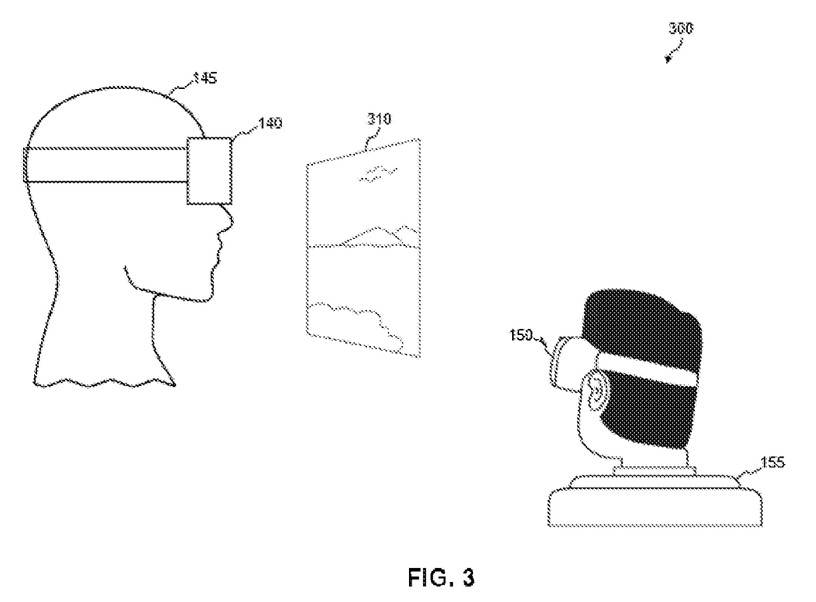
FIG. 3 illustrates a depiction of an interactive visualization generated by the system of FIG. 1, according to an exemplary embodiment.

FIG. 3 illustrates a 3D site visualization 300 generated by system 100, according to an exemplary embodiment. In particular, visualization 300 comprises an interactive map 310 derived from and/or associated with the surveying data which is depicted to computing devices 140 and 150 allowing users operating on the centralized platform or within the virtual environment to be able to collaboratively interact with the visualizations. As described herein, the visualizations may include, but are not limited to maps, virtual objects, holograms, volumetric videos, and any other applicable surveying-related multi-media content known to those of ordinary skill in the art. In some embodiments, computing device 140 is physically present on the applicable site being surveyed allowing remote users to receive depictions of the 3D visualizations rendered based on the surveying data. Users 145 and 155 may apply user inputs to interactive map 310 via their respective computing devices; however, gestures (e.g., swiping gestures, head movements, eye movements, etc.) may be applied to interactive map 310 in the instance where interactive map 310 is depicted in a virtual environment. In some embodiments, collaborative module 130 makes requests for surveying data that has been prioritized which triggers transmission of prioritized surveying data to collaborative module 130 for storing in a cloud-based repository, such as collaborative module database 135. This approach prevents requests for surveying data necessary to update the visualizations from requiring excessive computing resources for processing due to the fact that prioritized sensor data is iteratively being integrated into the surveying data in segments stored in surveying module database 125. Simultaneously, the requests are being responded to with prioritized surveying data that is necessary to render and depict the visualizations in accordance with the commands of users 145 and 155.

Figure 4:
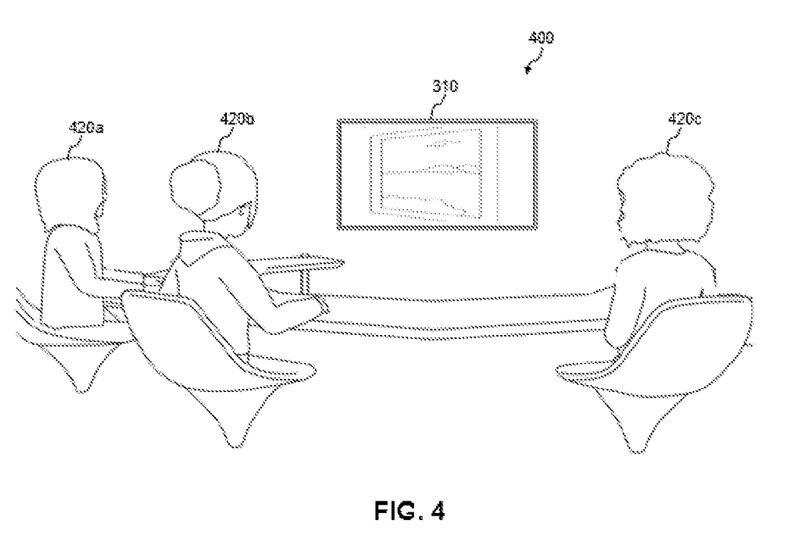
FIG. 4 illustrates a depiction of a collaborative environment depicting the interactive visualization of FIG. 3 within a virtual environment, according to an exemplary embodiment.

Referring now to FIG. 4, a virtual environment 400 depicting presentation of interactive map 310 is illustrated, according to an exemplary embodiment. It should be noted that one of the purposes of virtual environment 400 is to allow real-time collaboration on surveying maps amongst users operating on the applicable AR/yR hosting system. Avatars 420a-c are digital representation of users operating on the centralized platform and/or AR/VR hosting system, in which not only may they simultaneously view interactive map 310 among each other, but also view interactive map 310 in accordance with their respective commands processed by collaborative module 130. In order to support the latter functionality, prioritization of surveying data is important for reducing latency associated with rendering the visualizations due to the fact that the commands of users may be different and rendering of each visualization in light of the users' respective commands otherwise would require massive volumes of surveying data to be processed. Prioritized surveying data transmitted subject to the filtration process allows each user's respective visualization to be rendered with low-maintenance data processing. For example, converting massive amounts of sensor data into the 3D point cloud representation of the site being surveyed is not sustainable; thus, segmenting, prioritizing, and filtering the surveying data is performed at a data processing rate quick enough to keep latency low while still swiftly facilitating changes to the visualizations which are reflected in interactive map 310.

Figure 5:
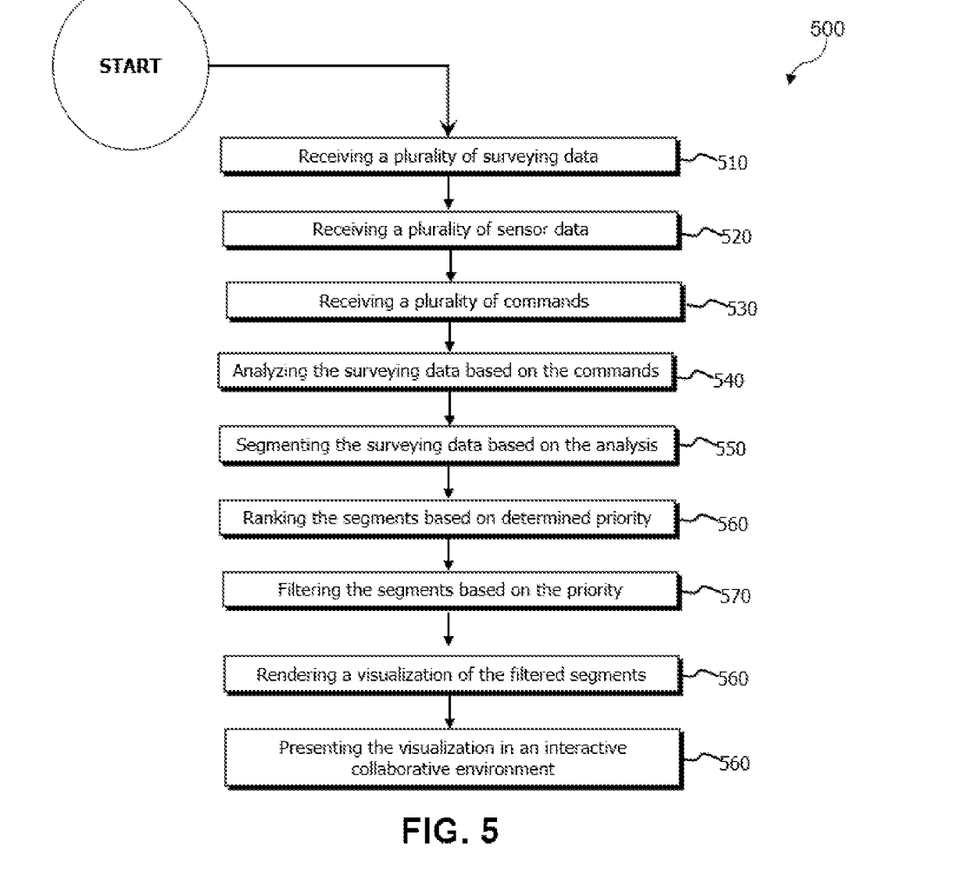
FIG. 5 illustrates an exemplary flowchart depicting a method for optimizing land surveying, according to an exemplary embodiment.

Referring now to FIG. 5, a method for optimizing surveying data 500 is depicted, accordingly to an exemplary embodiment. At step 510 of 500, the plurality of surveying data is received by surveying data module 120. It should be noted that additional types of data collected by server 110 may also be accounted for in the plurality of surveying data allowing various data sources that may apply to the surveying process such as weather data, crowdsourcing data, infrastructure data, social networking data, and the like to be taken into consideration when rendering the visualizations.

At step 520 of 500, sensor data module 210 receives the plurality of sensor data associated with the applicable site being surveyed by system 100. Sensor systems may include and/or be associated with computing devices 140 and 150, unmanned aerial devices ("UAVs"), land rovering devices, aquatic traversing devices, theodolites, electronic measuring devices, total stations, 3D scanners, GPS/GNSS, level and rod, and any other applicable devices/equipment including sensors associated with land surveying and mapping infrastructures known to those of ordinary skill in the art.

At step 530 of 500, command module 270 receives the plurality of commands from users 145 and 155. Commands may be provided in the form of user inputs on the centralized platform, linguistic inputs, natural language processed dialogue within the virtual environment, virtual interactions of users within the virtual environment depicting the visualizations, or any other applicable form of user input known to those ordinary skill in the art. At step 540 of 500, surveying data module 120 analyzes the surveying data based on the received commands. At step 550 of 500, segmentation module 250 segments the surveying data based on the analyses of step 540. At step 560 of 500, priority module 280 allocates priority to the segments of surveying data by ranking the segments according to various factors such as quality of data, requests for supplemental sensor data/detect data gaps, commands, feedback loops pertaining to the visualizations, and the like. At step 570, filtering of the segments of surveying data is performed by filtering module 260 based on the prioritization performed at step 560. At step 580, visualization module 290 and or the applicable CAD software renders the visualizations of the site surveyed based on the results of the filtration performed at step 570. At step 590, the visualizations are presented to users on the centralized platform and/or the virtual environment for collaborative interactions among the users in real-time.

Figure 6:
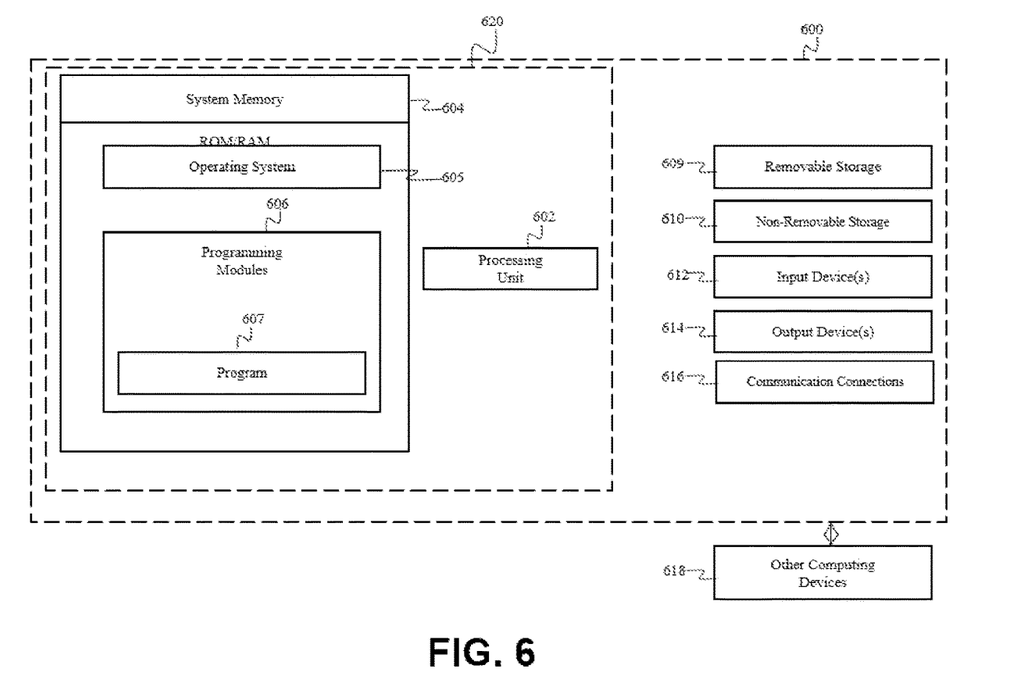
FIG. 6 illustrates a computer system according to exemplary embodiments of the present technology.

FIG. 6 is a block diagram of a system including an example computing device 600 and other computing devices. Consistent with the embodiments described herein, the aforementioned actions performed by server 202 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process/method 500. Process 500, and data related to said process may operate in other environments and are not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of server 202, for example. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 500 as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

What is claimed is:
1. A computer-implemented method for optimizing surveying data, the method comprising:
   receiving, by a computing device, a plurality of sensor data;

receiving, by the computing device, a plurality of commands associated with at least a site pertaining to the surveying data;
analyzing, by the computing device, the surveying data based on the plurality of commands;
wherein analyzing the surveying data comprises prioritizing segmented sensor data based on a ranking derived from the plurality of commands and detecting, by the computing device, an anomaly associated with the site; and
rendering, by the computing device, a virtual visualization of the site supporting virtual collaboration of a plurality of users based on the prioritization of the surveying data;
wherein the anomaly is overlaid on the virtual visualization.

2. The computer-implemented method of claim 1, further comprising:
notifying, by the computing device, at least one personnel at the site of a detected surveying data gap at the site based on the rendering; and
requesting, by the computing device, supplemental sensor data.

3. The computer-implemented method of claim 1, wherein analyzing the surveying data comprises:
segmenting, by the computing device, the plurality of sensor data based on the plurality of commands; and
filtering, by the computing device, the resulting segments based on a detected lower ranking;
wherein the prioritizing is based on one or more of a nature of the surveying project, the historical data associated with the site, contextual information, and a virtual environment designed for the virtual visualization.

4. The computer-implemented method of claim 3, wherein the surveying data iteratively integrates the unfiltered segments of sensor data.

5. The computer-implemented method of claim 3, wherein latency of rendering the virtual visualization of the site is reduced by the unfiltered segments being cleaned and stored in a cloud-based repository in real-time.

6. The computer-implemented method of claim 1, wherein rendering the 3D-mapping comprises:
generating, by the computing device, a 3D point cloud derived from the plurality of sensor data;
wherein the plurality of sensor data is ascertained from one or more of a mobile device, unmanned aerial vehicle (UAV), a land rovering vehicle, and an aquatic-based device.

7. The computer-implemented method of claim 1, wherein analyzing the surveying data further comprises:
utilizing, by the computing device, one or more of a reinforcement learning algorithm, a supervised learning algorithm, and unsupervised learning algorithm.

8. A computer program product for optimizing surveying data, the computer program product comprising a computer readable storage medium having program instructions embodied therewith, wherein the computer readable storage medium is not a transitory signal per se, the program instructions being executable by a processor to cause the processor to perform a method comprising:
receiving a plurality of sensor data;
receiving a plurality of commands associated with at least a site pertaining to the surveying data;
analyzing the surveying data based on the plurality of commands;
wherein analyzing the surveying data comprises prioritizing segmented sensor data based on a ranking derived from the plurality of commands and detecting an anomaly associated with the site; and
rendering a virtual visualization of the site supporting virtual collaboration of a plurality of users based on the prioritization of the surveying data;
wherein the anomaly is overlaid on the virtual visualization.

9. The computer program product of claim 8, further comprising:
notifying at least one personnel at the site of a detected surveying data gap at the site based on the rendering; and
requesting supplemental sensor data.

10. The computer program product of claim 8, analyzing the surveying data further comprises:
segmenting the plurality of sensor data based on the plurality of commands; and
filtering the resulting segments based on a detected lower ranking;
wherein the program instructions to prioritizing is based on one or more of a nature of the surveying project, the historical data associated with the site, contextual information, and a virtual environment designed for the virtual visualization.

11. The computer program product of claim 10, wherein the surveying data iteratively integrates the unfiltered segments of sensor data.

12. The computer program product of claim 10, wherein latency of rendering the virtual visualization of the site is reduced by the unfiltered segments being cleaned and stored in a cloud-based repository in real-time.

13. The computer program product of claim 8, wherein rendering the virtual visualization comprises:
generating a 3D point cloud derived from the plurality of sensor data;
wherein the plurality of sensor data is ascertained from one or more of a mobile device, unmanned aerial vehicle (UAV), a land rovering vehicle, and an aquatic-based device.

14. The computer program product of claim 8, analyzing the surveying data further comprises:
utilizing one or more of a reinforcement learning algorithm, a supervised learning algorithm, and unsupervised learning algorithm.

15. A computer system for optimizing surveying data, the computer system comprising:
one or more processors;
one or more computer-readable memories;
program instructions stored on at least one of the one or more computer-readable memories for execution by at least one of the one or more processors, the program instructions comprising:
program instructions to receive a plurality of sensor data;
program instructions to receive a plurality of commands associated with at least a site pertaining to the surveying data; and
program instructions to analyze the surveying data based on the plurality of commands;
wherein program instructions to analyze the surveying data further comprise program instructions to prioritize segmented sensor data based on a ranking derived from the plurality of commands and detect an anomaly associated with the site; and program instructions to render a virtual visualization of the site supporting virtual collaboration of a plurality of users based on the prioritization of the surveying data;

wherein the anomaly is overlaid on the virtual visualization.

16. The computer system of claim 15, further comprising:
program instructions to notify at least one personnel at the site of a detected surveying data gap at the site based on the rendering; and
program instructions to request supplemental sensor data.

17. The computer system of claim 15, wherein program instructions to analyze the surveying data further comprise:
program instructions to segment the plurality of sensor data based on the plurality of commands; and
program instructions to filter the resulting segments based on a detected lower ranking
wherein the program instructions to prioritize are based on one or more of a nature of the surveying project, the historical data associated with the site, contextual information, and a virtual environment designed for the virtual visualization.

18. The computer system of claim 17, wherein program instructions to render the virtual visualization comprise:
program instruction to generate a 3D point cloud derived from the plurality of sensor data;
wherein the plurality of sensor data is ascertained from one or more of a mobile device, unmanned aerial vehicle (UAV), a land rovering vehicle, and an aquatic-based device.

19. The computer system of claim 17, wherein the surveying data iteratively integrates the unfiltered segments of sensor data.

20. The computer system of claim 17, wherein latency of rendering the virtual visualization of the site is reduced by the unfiltered segments being cleaned and stored in a cloud-based repository in real-time.

* * * * *